(12) United States Patent
Mou et al.

(10) Patent No.: US 10,105,901 B2
(45) Date of Patent: *Oct. 23, 2018

(54) RAPID PROTOTYPING APPARATUS WITH PAGE-WIDTH ARRAY PRINTING MODULE

(71) Applicant: MICROJET TECHNOLOGY CO., LTD., Hsinchu (TW)

(72) Inventors: Hao-Jan Mou, Hsinchu (TW);
Kwo-Yuan Shi, Hsinchu (TW);
Yung-Lung Han, Hsinchu (TW);
Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 417 days.

This patent is subject to a terminal disclaimer.

(21) Appl. No.: 14/973,298

(22) Filed: Dec. 17, 2015

(65) Prior Publication Data

US 2016/0101574 A1 Apr. 14, 2016

Related U.S. Application Data

(63) Continuation-in-part of application No. 14/473,588, filed on Aug. 29, 2014, now Pat. No. 9,375,880.

(30) Foreign Application Priority Data

Sep. 13, 2013 (TW) .............................. 102133152 U
Dec. 19, 2014 (TW) .............................. 103144443 A

(51) Int. Cl.
*B29C 67/00* (2017.01)
*B41J 2/145* (2006.01)
(Continued)

(52) U.S. Cl.
CPC ........ *B29C 67/0059* (2013.01); *B29C 64/112* (2017.08); *B29C 64/20* (2017.08);
(Continued)

(58) Field of Classification Search
CPC ..... B29C 64/112; B29C 64/20; B29C 64/386; B29C 64/209; B29C 64/307; B29C 64/205

See application file for complete search history.

(56) References Cited

U.S. PATENT DOCUMENTS 6,007,318 A 12/1999 Russell et al.
7,896,639 B2 * 3/2011 Kritchman .......... B29C 67/0059
264/113

(Continued)

FOREIGN PATENT DOCUMENTS

JP 7-276638 10/1995
JP 2006-27015 2/2006
(Continued)

*Primary Examiner* — Yogendra N Gupta
*Assistant Examiner* — Emmanuel S Luk
(74) *Attorney, Agent, or Firm* — Kirton McConkie; Evan R. Witt

(57) ABSTRACT

A rapid prototyping apparatus with a page-width array printing module is disclosed. The rapid prototyping apparatus includes a construction platform, a movable platform and a page-width array printing module. The construction platform has a construction chamber. The length of the construction chamber is ranged from 0.8 m to 1.5 m, the width of the construction chamber is ranged from 0.8 m to 1.5 m, and the height of construction chamber is ranged from 0.8 m to 1.2 m. The movable platform is disposed above the construction platform. The page-width array printing module is installed on the movable platform and synchronously moved along a single direction in a reciprocating motion. The page-width array printing module has plural inkjet head structures disposed thereon, so that a rapid prototyping width-page printing operation is performed.

7 Claims, 10 Drawing Sheets

(51) Int. Cl.
*B29C 64/209* (2017.01)
*B29C 64/307* (2017.01)
*B29C 64/205* (2017.01)
*B29C 64/112* (2017.01)
*B29C 64/20* (2017.01)
*B33Y 50/02* (2015.01)
*B33Y 30/00* (2015.01)
*B29K 105/00* (2006.01)

(52) U.S. Cl.
CPC .......... *B29C 64/205* (2017.08); *B29C 64/209* (2017.08); *B29C 64/307* (2017.08); *B29C 67/0085* (2013.01); *B29C 67/0088* (2013.01); *B33Y 50/02* (2014.12); *B41J 2/145* (2013.01); *B29K 2105/0032* (2013.01); *B29K 2105/0058* (2013.01); *B33Y 30/00* (2014.12)

(56) References Cited

U.S. PATENT DOCUMENTS

| | | | | |
|---|---|---|---|---|
| 8,916,085 | B2 * | 12/2014 | Jackson | B29C 67/0059 264/401 |
| 9,511,544 | B2 * | 12/2016 | Hemingway | B33Y 70/00 |
| 9,724,879 | B2 * | 8/2017 | Kritchman | B29C 64/321 |
| 2003/0151167 | A1 * | 8/2003 | Kritchman | B29C 41/48 264/401 |
| 2004/0141018 | A1 * | 7/2004 | Silverbrook | B22F 3/008 347/4 |
| 2005/0104241 | A1 * | 5/2005 | Kritchman | B33Y 30/00 264/40.1 |
| 2005/0162462 | A1 | 6/2005 | Silverbrook et al. | |
| 2005/0157061 | A1 | 7/2005 | Silverbrook | |
| 2006/0054039 | A1 * | 3/2006 | Kritchman | B29C 41/02 101/424.1 |
| 2006/0127153 | A1 * | 6/2006 | Menchik | B41J 2/175 400/62 |
| 2011/0032301 | A1 | 2/2011 | Fienup et al. | |
| 2011/0215506 | A1 * | 9/2011 | Okamoto | B29C 35/08 264/401 |
| 2013/0040091 | A1 * | 2/2013 | Dikovsky | B29C 64/386 428/68 |
| 2015/0079213 | A1 * | 3/2015 | Shi | B29C 67/0059 425/130 |
| 2015/0079214 | A1 * | 3/2015 | Shi | B29C 67/0059 425/130 |
| 2015/0173203 | A1 * | 6/2015 | Din | B29C 67/0085 425/132 |
| 2015/0174824 | A1 * | 6/2015 | Gifford | B29C 67/0085 425/183 |
| 2015/0183163 | A1 * | 7/2015 | Beak | B29C 67/0059 264/496 |
| 2015/0190964 | A1 * | 7/2015 | Okamoto | B29C 67/0092 428/192 |
| 2015/0336410 | A1 * | 11/2015 | Weijkamp | B41J 29/38 347/9 |
| 2016/0236411 | A1 * | 8/2016 | Ohnishi | B41J 3/44 |
| 2017/0072644 | A1 * | 3/2017 | Ng | B29C 67/0088 |
| 2017/0095979 | A1 * | 4/2017 | Sasaki | B29C 67/0088 |
| 2017/0107383 | A1 * | 4/2017 | Okamoto | B33Y 70/00 |
| 2017/0136693 | A1 * | 5/2017 | Okamoto | B29C 67/0059 |
| 2017/0173887 | A1 * | 6/2017 | Sasaki | B33Y 30/00 |
| 2017/0320268 | A1 * | 11/2017 | Teken | B29C 64/357 |

FOREIGN PATENT DOCUMENTS

| | | |
|---|---|---|
| TW | I274669 | 3/2007 |
| TW | M391475 | 11/2010 |
| TW | 201217182 | 5/2012 |
| TW | 201338999 A | 10/2013 |

* cited by examiner

RAPID PROTOTYPING APPARATUS WITH PAGE-WIDTH ARRAY PRINTING MODULE

CROSS-REFERENCE TO RELATED APPLICATION

This application is a continuation-in-part of U.S. patent application Ser. No. 14/473,588 filed on Aug. 29, 2014 and entitled "RAPID PROTOTYPING APPARATUS WITH PAGE-WIDTH ARRAY PRINTING MODULE", the entirety of which is hereby incorporated by reference.

FIELD OF THE INVENTION

The present invention relates to a rapid prototyping apparatus, and more particularly to a rapid prototyping apparatus with a page-width array printing module.

BACKGROUND OF THE INVENTION

As known, the rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining an inkjet printing technology and a precise positioning technology of positioning the carriers. The producing method begins by first spreading a layer of powder on the carrier and then printing high viscosity liquid binder on part of the powder by using the inkjet printing technology, so that the liquid binder and the powder stick together to become solidified. After the above steps are repeatedly done, a three-dimensional physical model is produced by stacking multiple layers.

Conventionally, a printing module using the general inkjet printing technology and the rapid prototyping technology are collaboratively used to produce the three-dimensional physical model. FIG. 1 schematically illustrates the architecture of a printing module using the general inkjet printing technology according to the prior art. As shown in FIG. 1, the printing module 1 using the general inkjet printing technology is installed on a main body (not shown) in order to perform an inkjet printing operation. The printing module 1 comprises an inkjet printing platform 10, a carrying seat 12 and at least one inkjet head structure 11. The inkjet printing platform 10 comprises a bracket 101 and a transmission shaft 102. The transmission shaft 102 is spanned across the bracket 101. The carrying seat 12 is sheathed around the transmission shaft 102. The at least one inkjet head structure 11 is installed on the carrying seat 12. The carrying seat 12 and the at least one inkjet head structure 11 thereon can be moved relative to the transmission shaft 102 of the inkjet printing platform 10 along the Y-axis in a reciprocating motion.

When the printing module 1 performs the inkjet printing operation according to the RP technology, the carrying seat 12 and the at least one inkjet head structure 11 thereon are driven by the inkjet printing platform 10 and thus moved along the X-axis in a reciprocating motion. Moreover, the carrying seat 12 and the at least one inkjet head structure 11 are moved relative to the transmission shaft 102 of the inkjet printing platform 10 from left to right and from right to left along the Y-axis in the reciprocating motion. As the reciprocating motion of the at least one inkjet head structure 11 along the X-axis and the reciprocating motion of the at least one inkjet head structure 11 along the Y-axis are alternately performed, the viscosity liquid binder contained in the inkjet head structure 11 are printed on a construction material (not shown), which is spread by a construction platform (not shown). After the above steps are repeatedly done, a three-dimensional physical model (not shown) is produced by stacking multiple layers.

As mentioned above, the printing module using the general inkjet printing technology may be applied to the rapid prototyping technology in order to produce the three-dimensional physical model. However, the speed of forming the three-dimensional physical model is limited by the process of moving the inkjet head structure 11 along multiple axes (i.e. the X-axis and the Y-axis) to the construction material which is spread by the construction platform. Even if the stacking speed is 2~4 layers per minutes, it takes a very long time (e.g. several hours or longer) to form the large-sized object because the process of moving the inkjet head structure 11 along the multiple axes is very time-consuming.

Moreover, when the printing module using the general inkjet printing technology is applied to the rapid prototyping technology for producing the three-dimensional physical mode, the size of the construction chamber of the rapid prototyping apparatus is always defined under the considerations of operating the inkjet head structure of the printing module to move in an optimal-precision reciprocating motion, so that the size of the construction chamber for producing the three-dimensional physical mode is limited.

As mentioned above, the forming speed of the three-dimensional object by the conventional rapid prototyping apparatus is regarded as a bottle-neck technique in the rapid prototyping industry. How to overcome the issues encountered by the prior arts becomes a main problem that the rapid prototyping industry needs to resolve urgently.

Therefore, there is a need of providing a rapid prototyping apparatus with a page-width array printing module in order to produce a three-dimensional object with good quality at a faster speed.

SUMMARY OF THE INVENTION

An object of the present invention provides a rapid prototyping apparatus with a page-width array printing module for solving the problem about the limitation of the forming speed and the practical size of three-dimensional physical model while the general inkjet printing technology is used to perform the rapid prototyping operation, wherein optimal page-width array printing module is employed to obtain larger volume of the construction chamber, so as to accomplish the printing operation of large-size three-dimensional physical model at a faster speed.

In accordance with an aspect of the present invention, a rapid prototyping apparatus is provided. The rapid prototyping apparatus includes a construction platform, a movable platform and a page-width array printing module. The construction platform has a construction chamber, wherein the length of the construction chamber is ranged from 0.8 m to 1.5 m, the width of the construction chamber is ranged from 0.8 m to 1.5 m, and the height of construction chamber is ranged from 0.8 m to 1.2 m. The movable platform is disposed above the construction platform. The page-width array printing module is installed on the movable platform and synchronously moved along a single direction in a reciprocating motion. The page-width array printing module has plural inkjet head structures disposed thereon, so that a rapid prototyping width-page printing operation is performed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
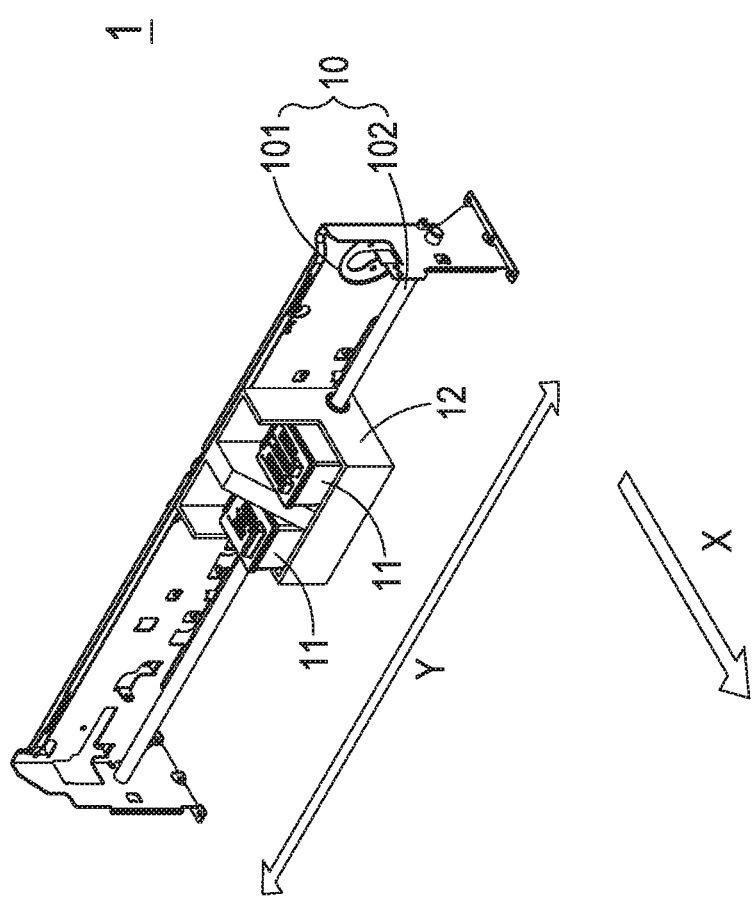
FIG. 1 schematically illustrates the architecture of a printing module using the general inkjet printing technology according to the prior art.

There is provided a rapid prototyping apparatus with a page-width array printing module, wherein the page-width array printing process is accomplished by the page-width array printing module. Comparing with the conventional printing technology accomplished by means of repeatedly performing the reciprocating motion, i.e. the reciprocating motion is repeatedly performed along Y axis as shown in FIG. 1, the page-width array printing module of the rapid prototyping apparatus has plural inkjet head structures configured as a page-width array printing unit and capable of printing at the same time, so as to save a lot of time during printing.

Figure 2A:
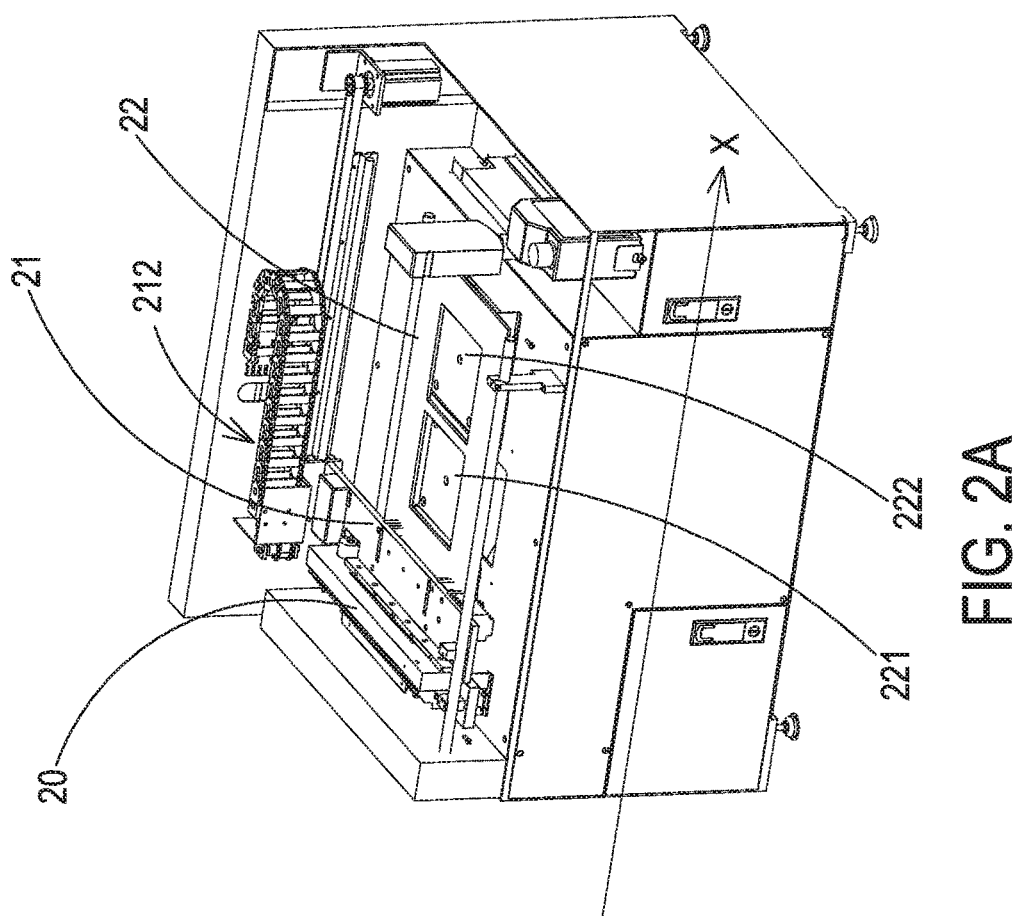
FIG. 2A schematic illustrates a rapid prototyping apparatus according to an embodiment of the present invention.
Figure 2B:
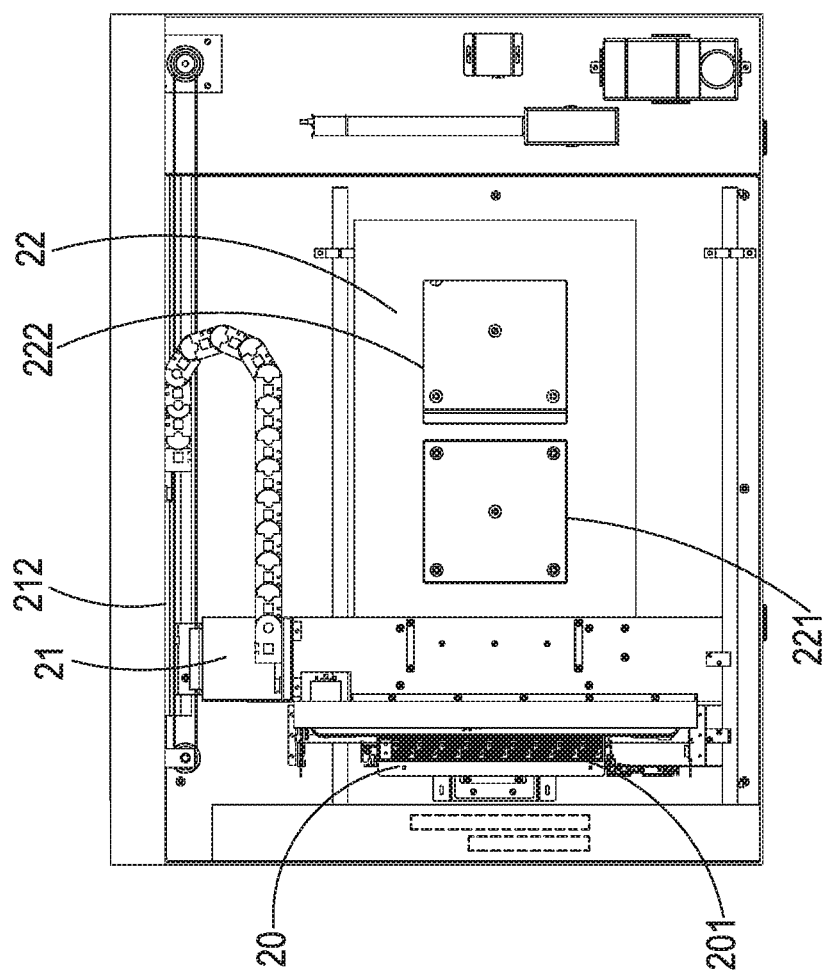
FIG. 2B is a schematic top view illustrating the rapid prototyping apparatus of FIG. 2A.
Figure 2C:
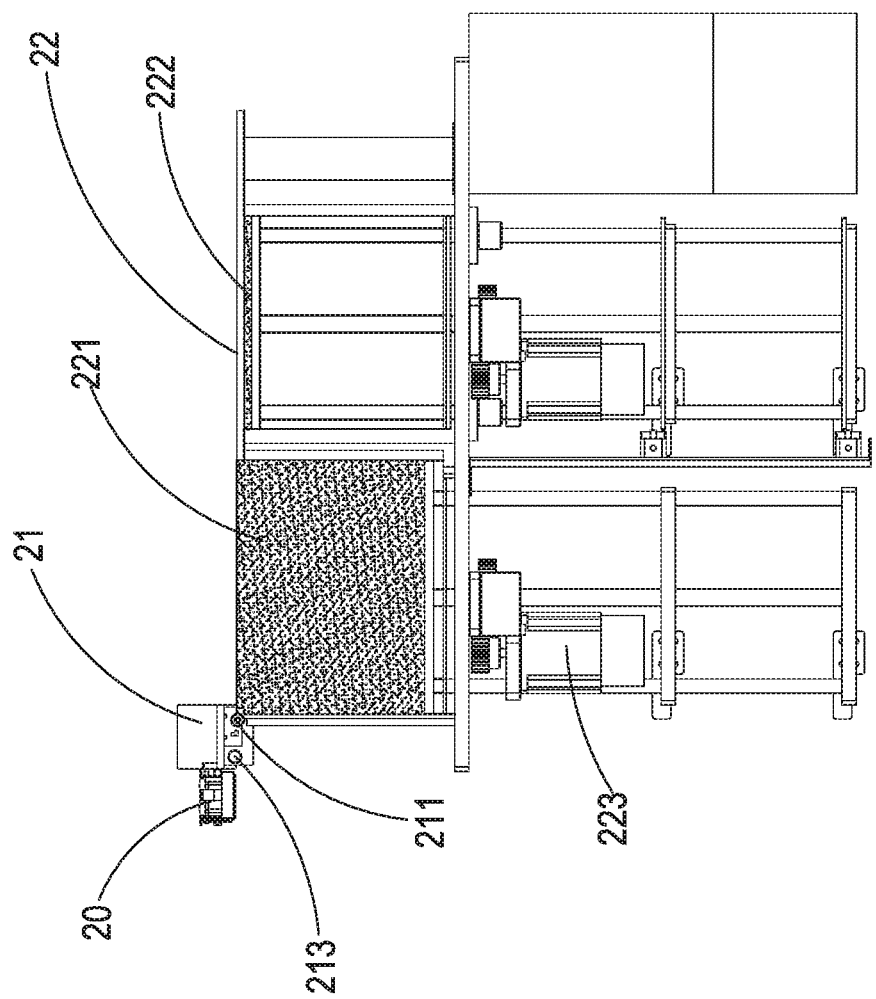
FIG. 2C is a schematic cross sectional view illustrating the rapid prototyping apparatus of FIG. 2A.

As shown in FIGS. 2A, 2B and 2C, the implementation of a rapid prototyping apparatus 2 includes a page-width array printing module 20, a movable platform 21, and a construction platform 22.

The page-width array printing module 20 is installed on the movable platform 21, and the page-width array printing module 20 is capable of being moved by the movable platform 21 to a position over the construction platform 22. When the movable platform 21 is driven by a moving mechanism 212, the movable platform 21 is horizontally moved relative to the construction platform 22 along the X-axis. Moreover, the construction platform 22 comprises a construction material supply container 221 and a construction chamber 222. The construction material supply container 221 is used for temporarily storing a construction material. When the movable platform 21 is moved to the construction material supply container 221, a specified amount of construction material may be guided to the topmost layer by a lift/lower mechanism 223 disposed under the construction material supply container 221 and the desired amount is kept for horizontally pushing on the construction platform 22. Then, the construction material at the topmost layer of the construction material supply container 221 is horizontally pushed to the adjacent construction chamber 222 by a construction material pushing element 211, which is installed on the movable platform 21. Consequently, a construction layer is formed and capable of being printed by the page-width array printing module 20, so as to produce a three-dimensional object by stacking multiple layers. In addition, the movable platform 21 further includes a heater 213, wherein the heater 213 is installed on the movable platform 21, and the heater 213 is configured to heat the construction material after the construction material is spread in the construction chamber 222, so as to increase the printing and forming speed.

According to the above descriptions, there is provided a rapid prototyping apparatus with a page-width array printing module capable of being employed to form relatively large-sized three-dimensional physical model. The size of construction chamber 222 is capable of being designed as large as possible without meeting an optimal-precision reciprocating motion of the inkjet head structure of the conventional printing module. The size of a rapid prototyping apparatus with a page-width array printing module can't be infinite. Consequently, an optimal size of the construction chamber 222 is employed and assembled with a suitable-sized page-width array printing module, so as to accomplish the rapid prototyping apparatus of the present invention for printing large-sized three-dimensional physical model. It is illustrated in the following preferred embodiments.

Figure 3A:
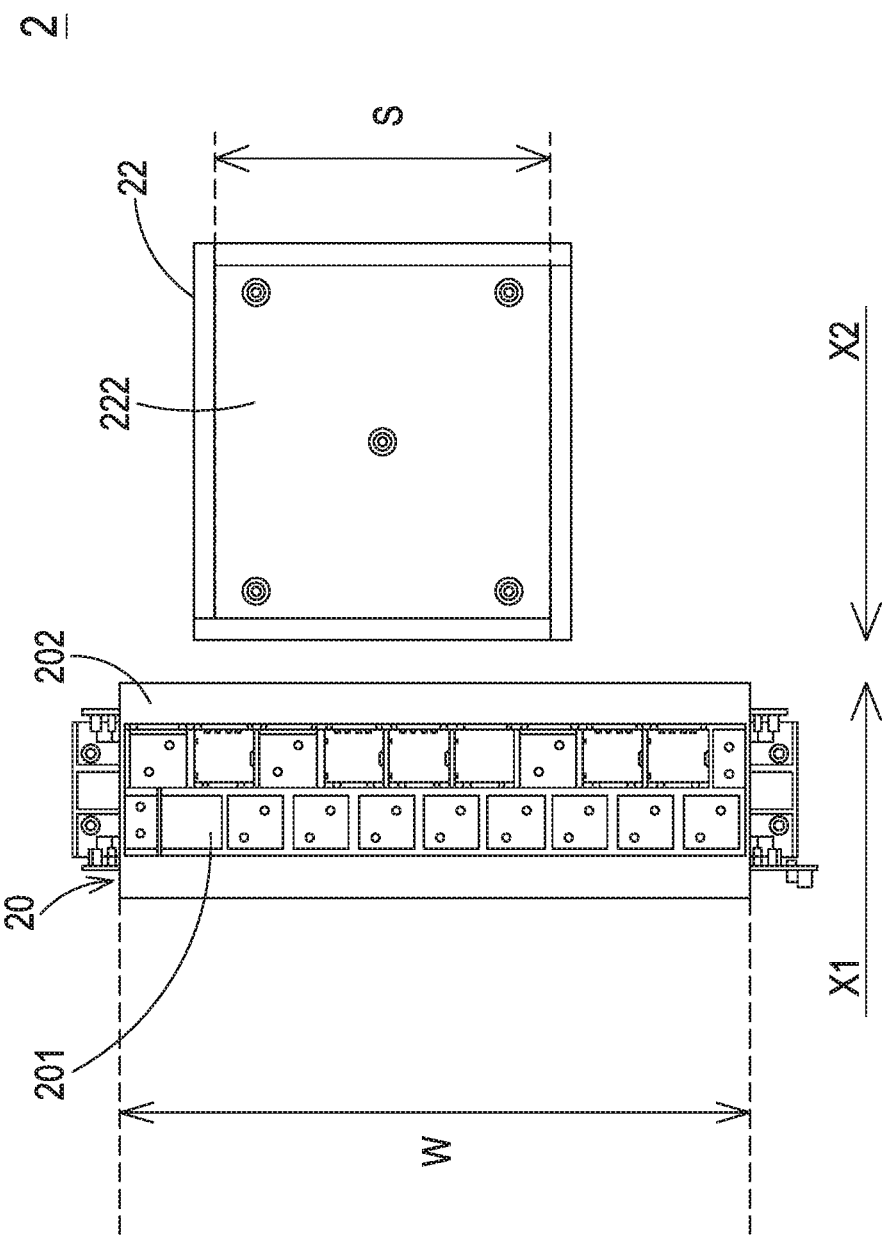
FIG. 3A is a schematic top view illustrating the relationship between a page-width array printing module and a construction chamber of a rapid prototyping apparatus according to an embodiment of the present invention.
Figure 3B:
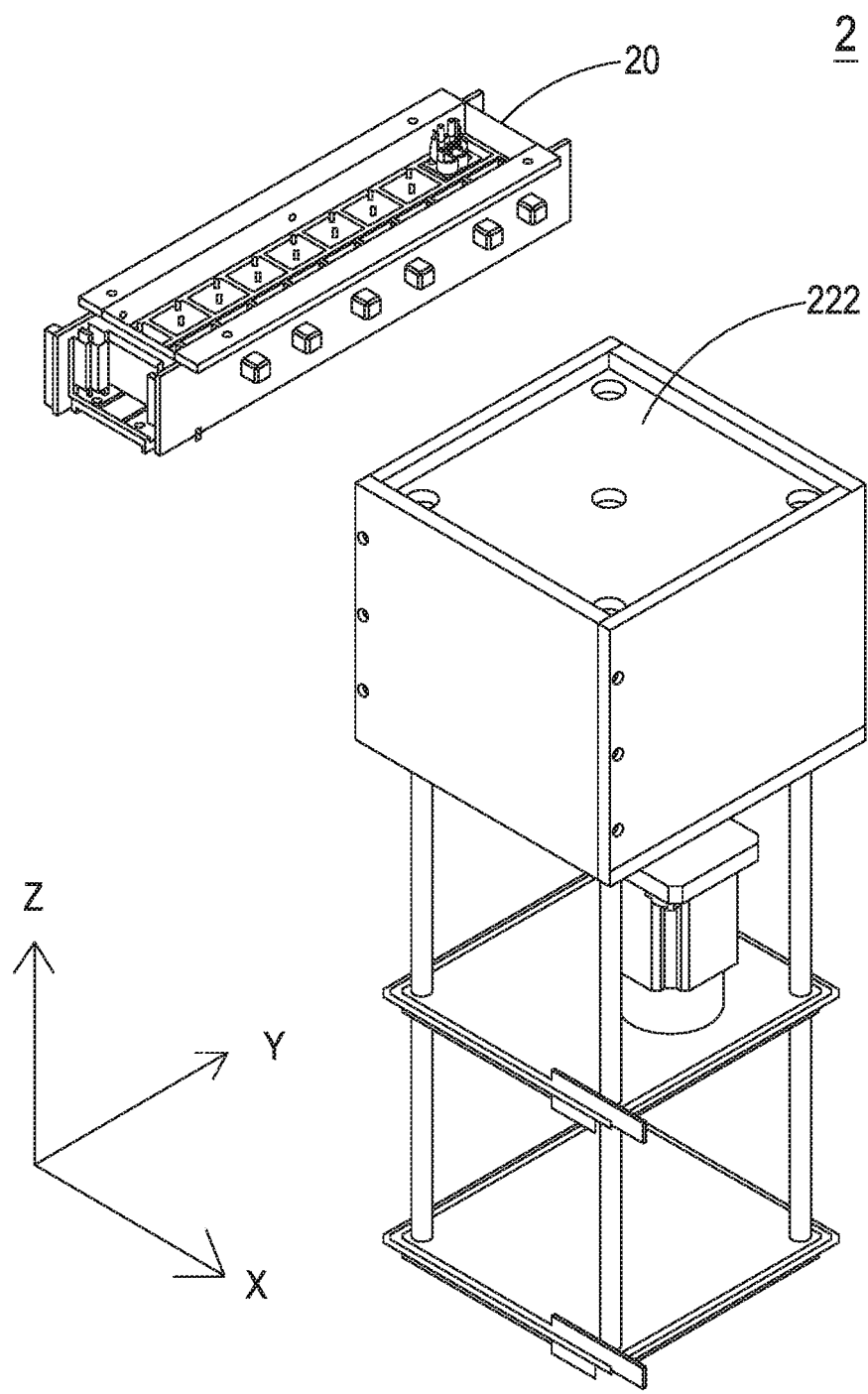
FIG. 3B is a schematic perspective view illustrating the relationship between the page-width array printing module and the construction chamber of FIG. 3A.

FIGS. 3A and 3B are respectively a schematic top view and a schematic perspective view illustrating the relationship between a page-width array printing module and a construction chamber of a rapid prototyping apparatus according to an embodiment of the present invention. As shown in FIG. 3A, the rapid prototyping apparatus 2 (see FIG. 2A) includes a page-width array printing module 20 and a construction platform 22, and the construction platform 20 has a construction chamber 222.

As shown in FIG. 3B, the volume of the construction chamber 222 can be acquired according to the length, the width and the height described as below. The length (i.e. X-axis direction) of the construction chamber 222 is ranged from 0.8 m to 1.5 m, the width (i.e. Y-axis direction) of the construction chamber 222 is ranged from 0.8 m to 1.5 m, and the height (i.e. Z-axis direction) of the construction chamber 222 is ranged from 0.8 m to 1.2 m. Preferably, the length of the construction chamber 222 is ranged from 1 m to 1.3 m, the width of the construction chamber 222 is ranged from 1 m to 1.3 m, and the height of the construction chamber 222 is ranged from 0.9 m to 1.1 m.

Figure 4A:
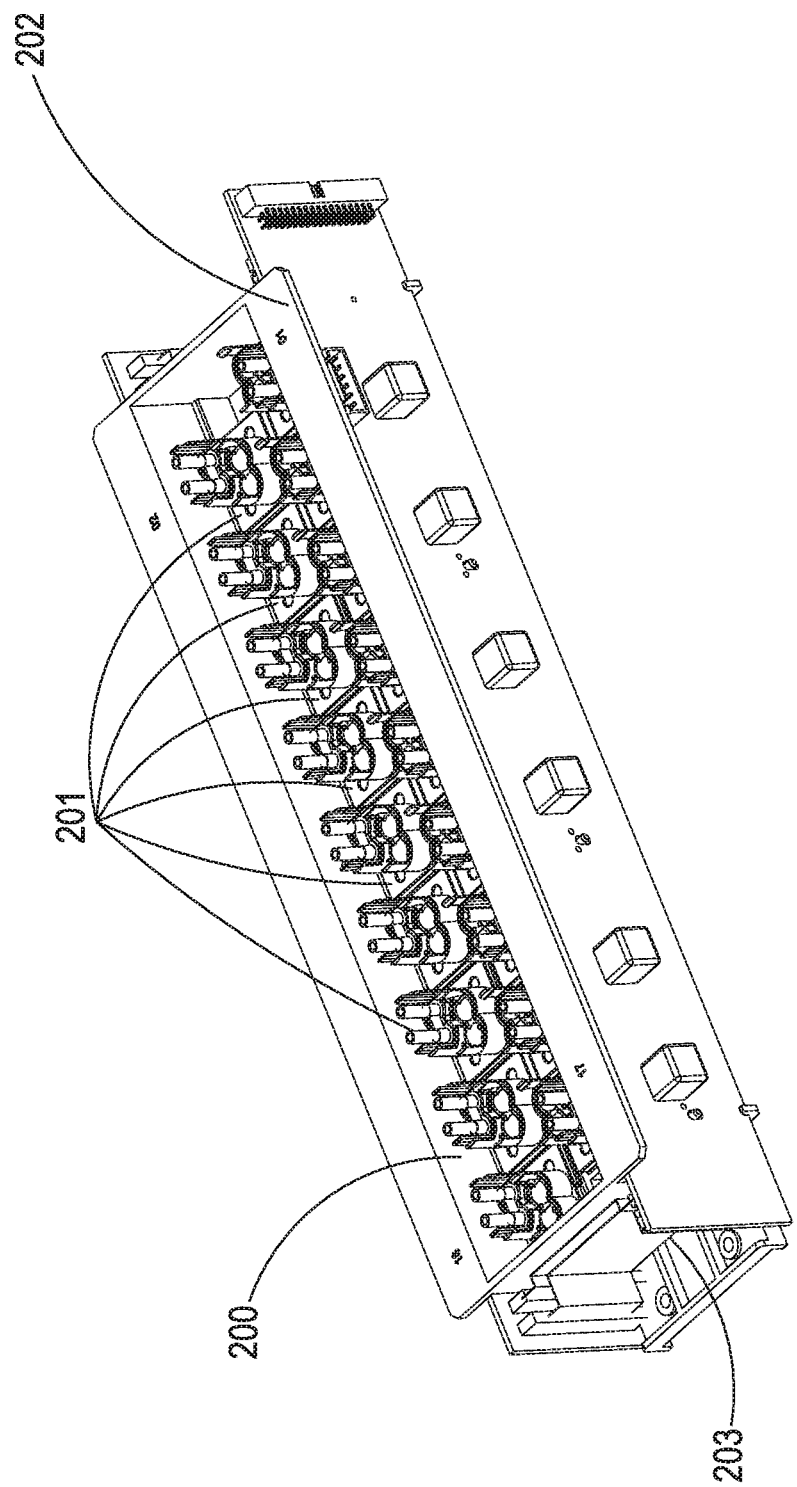
FIG. 4A schematically illustrates an exemplary printing platform used in the rapid prototyping apparatus of FIG. 2A.
Figure 4B:
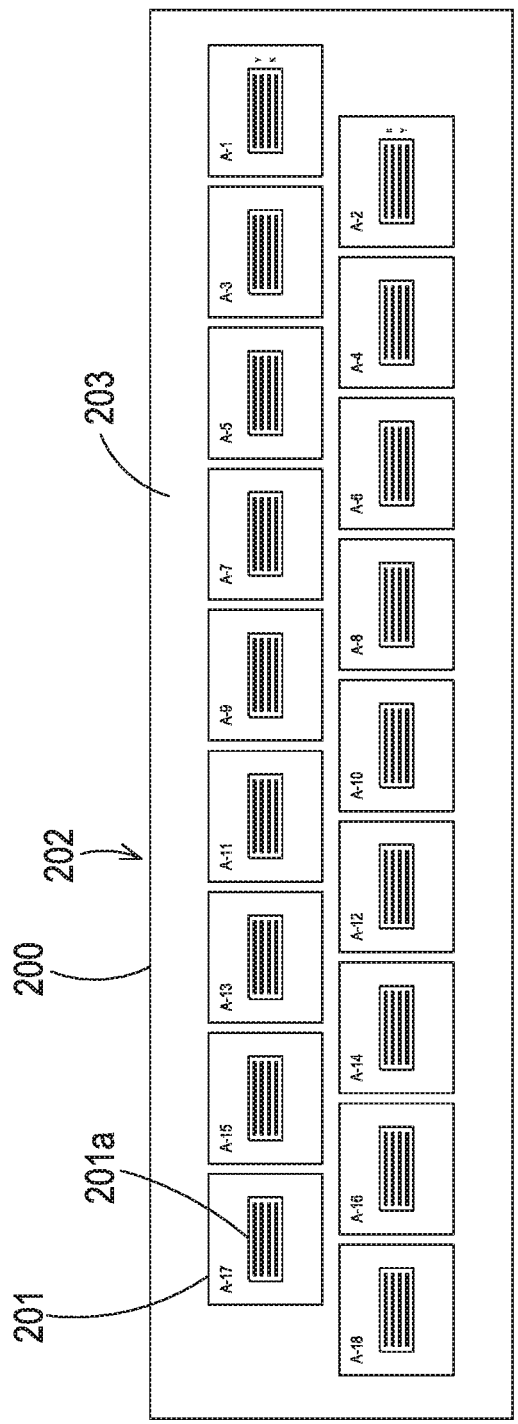
FIG. 4B schematically illustrates the arrangement of plural inkjet heat structures and respective inkjet chips of FIG. 4A.
Figure 4C:
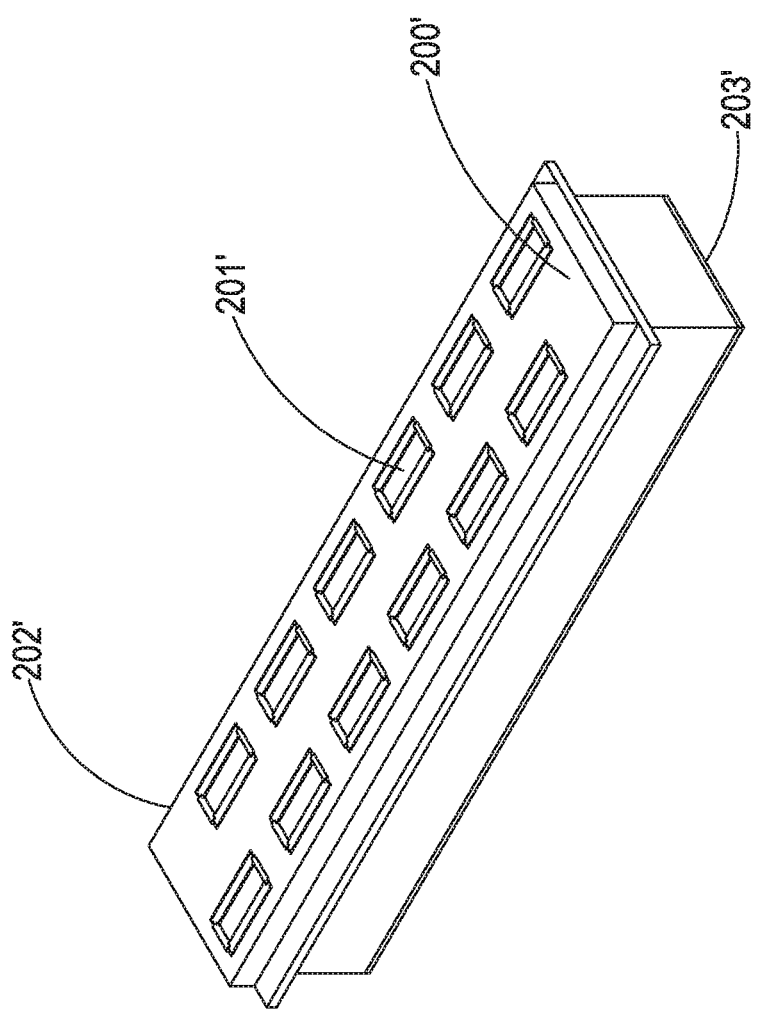
FIG. 4C schematically illustrates a variant example of the printing platform used in the rapid prototyping apparatus of FIG. 2A.
Figure 4D:
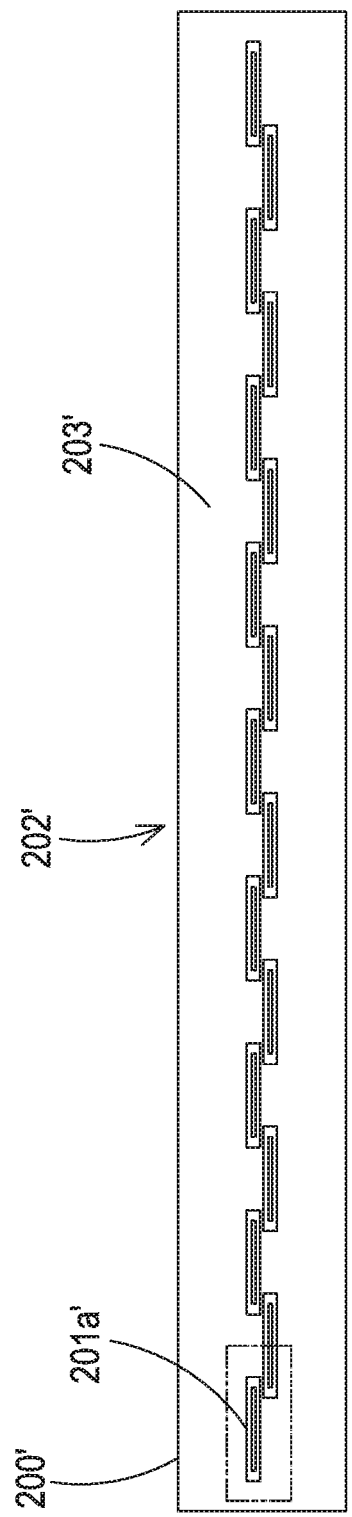
FIG. 4D schematically illustrates the arrangement of plural inkjet heat structures and respective inkjet chips of FIG. 4C.

As shown in FIGS. 3A, 3B, 4A, 4B, 4C and 4D, wherein FIG. 4A schematically illustrates an exemplary printing platform used in the rapid prototyping apparatus of FIG. 2A, FIG. 4B schematically illustrates the arrangement of plural inkjet heat structures and respective inkjet chips of FIG. 4A, FIG. 4C schematically illustrates a variant example of the printing platform used in the rapid prototyping apparatus of FIG. 2A, and FIG. 4D schematically illustrates the arrangement of plural inkjet heat structures and respective inkjet chips of FIG. 4C. The construction chamber 222 and the page-width array printing module 20 are designed in proper proportions. The page-width array printing module 20 includes at least one printing platform 202 and plural inkjet head structures 201, and the plural inkjet heads structures 201 are installed on the printing platform 202, so as to form at least one page-width array printing unit 200.

The above printing platform 202 is capable of being implemented in two different embodiments. FIGS. 4A and 4C illustrate two different embodiments of the printing platform 202.

As shown in the embodiment of FIG. 4A, the plural inkjet head structures 201 installed on the printing platform 202 are replaceable. Namely, in the page-width array printing unit 200, the plural inkjet head structures 201 installed on the printing platform 202 are independent inkjet cartridges and can be replaced independently. Consequently, if a specified inkjet head structure 201 is subject to maintain or renew, it is only necessary to replace the specified inkjet head structure 201 without the need of replacing the whole printing platform 202 with a new one.

In another embodiment, as shown in FIG. 4C, the plural inkjet head structures 201' installed on the printing platform 202' are irreplaceable. In other words, the printing platform 202' is an integrated package structure, the plural inkjet head structures 201' are securely fixed thereon, and thus the plural inkjet head structures 201' in the page-width array printing unit 200 are irreplaceable. Consequently, if the page-width array printing unit 200' is subject to maintain or renew, it is necessary to replace the printing platform 202' with a new one.

As mentioned above, the plural inkjet head structures 201 of the page-width array printing module 20 are replaceable, and the plural inkjet head structures 201' of the page-width array printing module 20 are irreplaceable. Moreover, each inkjet head structure 201 installed on the page-width array printing unit 200 includes an inkjet chip 201a, and each inkjet head structure 201' installed on the page-width array printing unit 200' includes an inkjet chip 201a'. The inkjet chips 201a are formed on a bottom surface 203 of the printing platform 202, and the inkjet chips 201a' are formed on a bottom surface 203' of the printing platform 202' (see FIGS. 4B and 4D respectively). As shown in FIG. 4B, it is found that the replaceable inkjet head structures 201 include respective inkjet chips 201a. FIG. 4D illustrates the arrangement of plural inkjet heat structures 201'of the page-width array printing unit 200' and respective inkjet chips 201a' on the bottom surface 203' of the printing platform 202', wherein the plural inkjet head structures 201' are irreplaceable. Moreover, as shown in FIGS. 4B and 4D, the inkjet chips 201a of the inkjet head structures 201 are installed on the printing platform 202, and the inkjet chips 201a' of the inkjet head structures 201' are installed on the printing platform 202'. The plural inkjet chips 201a, 201a' are arranged in at least one row and in a staggered form. Consequently, the overall printing width W of the page-width array printing unit 200, 200' is larger than or equal to the width S of the construction chamber 222 (see FIG. 3A).

The above inkjet chips 201a, 201a' are arranged under the considerations of the optimal volume of the construction chamber 222 and the optimal resolution of keeping high printing quality, so as to accomplish the rapid prototyping apparatus for printing large-sized three-dimensional physical model. In some embodiments, the volume of the construction chamber 222 is designed according to the length, the width and the height described as below. The length of the construction chamber 222 is ranged from 0.8 m to 1.5 m, the width of the construction chamber 222 is ranged from 0.8 m to 1.5 m, and the height of the construction chamber 222 is ranged from 0.8 m to 1.2 m. Preferably, the length of the construction chamber 222 is ranged from 1 m to 1.3 m, the width of the construction chamber 222 is ranged from 1 m to 1.3 m, and the height of the construction chamber 222 is ranged from 0.9 m to 1.1 m. The length of the inkjet chips 201a, 201a' is arranged from 2 inches to 2.25 inches. Moreover, each page-width array printing unit 200, 200' has plural inkjet chips 201a, 201a' arranged in at least one row and in a staggered form. The number of the plural inkjet chips 201a, 201a' are ranged from 16 to 35. Preferably, the number of the plural inkjet chips 201a, 201a' are ranged from 20 and 31, so as to produce a three-dimensional object with good quality at a faster speed.

While the page-width array printing module 20 performs a rapid prototyping width-page printing operation, the page-width array printing module 20 is moved relative to the construction platform 22. Namely, the page-width array printing module 20 is moved horizontally along a direction X1 as shown in FIG. 3A. When the page-width array printing module 20 is moved to the position over the construction chamber 222 of the construction platform 22, the rapid prototyping width-page printing operation is performed in the construction chamber 222 by the page-width array printing module 20. Since the page-width array printing module 20 comprises the plural inkjet head structures 201, the overall printing width W of the plural inkjet head structures 201 is larger than or equal to the width S of the construction chamber 222. Consequently, during the process of performing the rapid prototyping width-page printing operation, the page-width array printing module 20 is moved along a single axis (i.e. the X-direction). Namely, it is not necessary to move the page-width array printing module 20 along the Y-axis. Under this circumstance, the printing speed and the printing efficiency are both enhanced.

As mentioned above, the page-width array printing module 20 is moved relative to the construction platform 22 along the direction X1. It is noted that numerous modifications may be mode while retaining the teachings of the present invention. For example, in another embodiment, the construction platform 22 may be horizontally moved relative to the page-width array printing module 20 along a direction X2 as shown in FIG. 3A. When the construction chamber 222 is moved by the construction platform 22 to be moved to the position under the page-width array printing module 20, the rapid prototyping width-page printing operation is performed in the construction chamber 222 by the page-width array printing module 20. Alternatively, in another embodiment, the page-width array printing module 20 and the construction platform 22 are moved relative to each other along the directions X1 and X2, respectively. When the page-width array printing module 20 is moved to the position over the construction chamber 222 of the construction platform 22, the rapid prototyping width-page printing operation is performed in the construction chamber 222 by the page-width array printing module 20.

As mentioned above, the page-width array printing module 20 may be moved relative to the construction platform 22, the construction platform 22 may be moved relative to the page-width array printing module 20, or the page-width array printing module 20 and the construction platform 22 are moved relative to each other. In other words, the page-width array printing module 20 and/or the construction platform 22 is moved along a single axis (i.e. the X-axis) while performing the rapid prototyping width-page printing operation. In comparison with the conventional technology, it is not necessary to move the page-width array printing module 20 and/or the construction platform 22 along another axis (i.e. the Y-axis) when the rapid prototyping width-page printing operation of the present invention is performed. Consequently, the printing speed and the printing efficiency of the present invention are both enhanced.

From the above descriptions, the present invention provides a rapid prototyping apparatus with a page-width array printing module, wherein the page-width array printing module is capable of moving relative to the construction platform and the construction chamber of the construction platform, and a rapid prototyping width-page printing operation is capable of being performed in the construction chamber, so that the speed and efficiency of forming the three-dimensional object will be largely enhanced by the rapid prototyping width-page printing operation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rapid prototyping apparatus, comprising:
a construction platform comprising a construction chamber, wherein the length of the construction chamber is ranged from 0.8 m to 1.5 m, the width of the construction chamber is ranged from 0.8 to 1.5 m, and the height of construction chamber is ranged from 0.8 m to 1.2 m;
a movable platform disposed above the construction platform; and
a page-width array printing module installed on the movable platform and synchronously moved along a single direction in a reciprocating motion, wherein the page-width array printing module comprises at least one printing platform and plural inkjet head structures disposed thereon, and the plural inkjet head structures are installed on the printing platform and collaboratively defined as at least one page-width array printing unit, wherein the plural inkjet head structures of each page-width array printing unit and replaceable and comprise respective inkjet chips, and the inkjet chips are disposed on the printing platform and arranged in at least one row and in a staggered form, so that a printing width of the page-width array printing unit is larger than or equal to the width of the construction chamber, and a rapid prototyping width-page printing operation is performed.

2. The rapid prototyping apparatus according to claim 1, wherein the length of the construction chamber is ranged from 1 m to 1.3 m, the width of the construction chamber is ranged from 1 m to 1.3 m, and the height of construction chamber is ranged from 0.9 m to 1.1 m.

3. The rapid prototyping apparatus according to claim 1, wherein the movable platform is disposed on the construction platform, and the movable platform and the construction platform are movable relative to each other, so that a construction material is pushed to the construction chamber.

4. The rapid prototyping apparatus according to claim 1, wherein the length of the inkjet chips is ranged from 2 inches to 2.25 inches.

5. The rapid prototyping apparatus according to claim 1, wherein the inkjet chips of the at least one page-width array printing unit are arranged in at least one row and in a staggered form, and the number of the inkjet chips is ranged from 16 to 35.

6. The rapid prototyping apparatus according to claim 5, wherein the number of the inkjet chips arranged in at least one row and in a staggered form is ranged from 20 to 31.

7. The rapid prototyping apparatus according to claim 3, wherein the movable platform further comprises a heater, and the heater is configured to heat the construction material after the construction material is spread in the construction chamber.

* * * * *